United States Patent
Bai et al.

(10) Patent No.: US 7,801,445 B2
(45) Date of Patent: Sep. 21, 2010

(54) METHOD AND APPARATUS FOR DWDM LINE CARD

(75) Inventors: Yu Sheng Bai, Los Altos Hills, CA (US); Xiao Andy Shen, San Bruno, CA (US)

(73) Assignee: FutureWei Technologies, Inc., Plano, TX (US)

(*) Notice: Subject to any disclaimer, the term of this patent is extended or adjusted under 35 U.S.C. 154(b) by 547 days.

(21) Appl. No.: 11/857,990

(22) Filed: Sep. 19, 2007

(65) Prior Publication Data

US 2008/0205901 A1 Aug. 28, 2008

Related U.S. Application Data

(60) Provisional application No. 60/891,199, filed on Feb. 22, 2007.

(51) Int. Cl.
*H04J 14/00* (2006.01)
*H04J 14/02* (2006.01)
*H04B 10/00* (2006.01)

(52) U.S. Cl. .................. 398/83; 398/46; 398/155

(58) Field of Classification Search .............. 398/25, 398/33, 82, 83, 136–139, 154, 155, 175, 398/176, 46, 48–50, 55, 56
See application file for complete search history.

(56) References Cited

U.S. PATENT DOCUMENTS

| | | | |
|---|---|---|---|
| 6,476,953 B1 | 11/2002 | Morkel | |
| 7,113,667 B2 | 9/2006 | Welch et al. | |
| 7,123,786 B2 | 10/2006 | Welch et al. | |
| 7,164,692 B2* | 1/2007 | Cox et al. | 370/466 |
| 2004/0052528 A1* | 3/2004 | Halgren et al. | 398/75 |
| 2005/0226627 A1 | 10/2005 | Claringburn | |
| 2008/0089693 A1* | 4/2008 | El-Ahmadi et al. | 398/135 |

FOREIGN PATENT DOCUMENTS

EP 1 156 604 A2 11/2001

(Continued)

OTHER PUBLICATIONS

Agata et al., "Performance Analysis of Forward Error Correction Codes for Various Degradating Factors in Optical Transmission System", Submarine System, Sep. 1, 2006.

(Continued)

*Primary Examiner*—Dalzid Singh
(74) *Attorney, Agent, or Firm*—Slater & Matsil, L.L.P.

(57) ABSTRACT

A system and method for multiple-channel line card. The system includes a first photonic integrated device configured to receive a first optical signal and output a first plurality of electrical signals for a first plurality of channels respectively. The first plurality of channels corresponds to a first plurality of wavelength ranges associated with the first optical signal. Additionally, the system includes a first clock and recovery device configured to receive the first plurality of electric signals and retime the first plurality of electric signals, and a first switch coupled to the first clock and recovery device, a first interface, and a second interface. Moreover, the system includes the first interface configured to output a second plurality of electrical signals to another system for multiple-channel line card, and the second interface configured to couple with one or more plugged first channel devices.

22 Claims, 8 Drawing Sheets

FOREIGN PATENT DOCUMENTS

| | | |
|---|---|---|
| EP | 1 436 931 B1 | 12/2005 |
| WO | WO 03/103204 A1 | 12/2003 |

OTHER PUBLICATIONS

Hashimoto et al., "Multichip Optical Hybrid Integration Technique With Planar Lightwave Circuit Platform", Journal of Lightwave Technology, vol. 16, No. 7, Jul. 1998. pp. 1249-1258.

Liu et al, "Enhanced FEC OSNR Gains in Dispersion-Uncompensated 10.7-Gb/s Duobinary Tranmission Over 200-km SSMF", IEEE Photonics Technology Letters, vol. 15, No. 8, Aug. 2003, pp. 1162-1164.

Seki et al., "Single-Chip FEC Codec Using A Concatenated BCH Code For 10Gb/S Long-Haul Optical Transmission Systems", IEEE 2003 Custom Integrated Circuits Conference, pp. 279-282.

Soole et al., "Multipurpose Reconfigurable Optical Add-Drop Multiplexer (ROADM)", Post-deadline session 3.PD, 2006.

Tebben et al, "Two-Fiber Optical Shared Protection Ring with Bi-directional 4×4 Optical Swittch Fabrics", 0-7803-7105-4/01 2001 IEEE, pp. 228-229.

International Search Report and Written Opinion of PCT Application No. PCT/CN2008/070157, date of mailing May 8, 2008, 12 pages total.

\* cited by examiner

Errors from electrical impairments

METHOD AND APPARATUS FOR DWDM LINE CARD

CROSS-REFERENCES TO RELATED APPLICATIONS

This application claims priority to U.S. Provisional Application No. 60/891,199, filed on Feb. 22, 2007, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a system and method for low-cost multi-channel DWDM line card based on monolithically/hybrid integrated DWDM transmitter/receiver arrays. Merely by way of example, an application of the invention is a cost-competitive replacement of an EDFA, ROADM as well as a wavelength switch, but it should be recognized that the invention has a broader range of applicability.

Dense wavelength division multiplexing (DWDM), since its deployment in 1990s, has become a driving force for the rapid growth of various traffic in the long haul, regional as well as metro area networks. Recent convergence of video, voice and data, and the explosion of new applications such as video podcasting and peer-to-peer file sharing pose significant challenges to DWDM engineers to meet the dynamic wavelength demands for user services. For example, the traditional DWDM networks are based on EDFAs, DCMs and fixed OADMs and often unable to provision unplanned wavelength services. Supporting a new service in a current DWDM network often translates to the extended downtime of the network, increasing significantly service provider's operation expenses. To accommodate the changes due to service demands and traffic growth, it is often desirable for service providers to simplify their DWDM networks and move towards more efficient and flexible network managements while still maintaining high levels of reliability. Thus, it is desirable for new DWDM networks to meet basic requirements, such as simplicity, flexibility, robustness and bandwidth utilization efficiency.

Reconfigurable OADM (ROADM) is one of the promising optical solutions developed recently to meet the rapid increase of wavelength-service demands. With ROADM, service providers can dynamically provision the networks, adding new services and/or reallocating unused capacity. However, ROADM often has addressed only the flexibility aspect of the DWDM networks, leaving unresolved other issues such as simplicity, robustness and bandwidth utilization efficiency. In some cases, ROADM actually can complicate these issues. For example, in a ROADM-based ring network for metro applications, dynamic provisioning with ROADM often requires sophisticated optical power management algorithms with pre-knowledge of the new configuration to be able to re-evaluate parameters such as OSNR and mix-n-match penalty. Any change in network configuration with ROADM usually result in a performance change of every link in the network due to shared nature of EDFAs. Adding a new node can further complicate the ROADM-based networks and usually requires re-engineering because of, for example, inadequate OSNR.

On the other hand, recent development of integrated DWDM transmitter/receiver offers a potential solution to the next generation DWDM networks. For example, the arrayed DWDM LR transmitters/receivers may allow optical signals of different wavelengths to be first converted to electrical signals at every node regardless of their final destinations and reconverted back to optical signals, if not to be dropped, for transmission over fiber to the downstream node. This full regeneration approach in principle can eliminate EDFAs and DCMs and hence the optical power management, simplifying considerably the DWDM networks. In addition, with the use of a high-speed N×N electrical switch in the line card, one can configure the node to become effectively an enhanced ROADM node that offers signal regeneration and ROADM functions simultaneously. Furthermore, bandwidth efficiency and robustness (excluding fiber cut) often can be realized by using 1:N shared protection of transponder arrays. Studies show that with 1:12 protection re-generation using arrayed transponders can have better reliability than an EDFA.

But the integrated DWDM transmitter/receiver arrays, although promising from the performance point of view, are costly as a replacement for EDFAs and/or ROADM. It is usually not economically viable unless the cost of two such array units (which makes a re-generation/ROADM node) becomes less than that of an EDFA plus an ROADM. For example, the monolithic integration on InP can not meet this cost target. Even with recently proposed low-cost hybrid integration, the use of arrayed transponders to replace an EDFA and ROADM is still too costly to justify its deployment in many applications. For example, the associated electronic components such as FEC chips are the cost bottleneck.

Hence it is highly desirable to improve techniques for DWDM systems.

BRIEF SUMMARY OF THE INVENTION

The present invention relates in general to telecommunication techniques. More particularly, the invention provides a system and method for low-cost multi-channel DWDM line card based on monolithically/hybrid integrated DWDM transmitter/receiver arrays. Merely by way of example, an application of the invention is a cost-competitive replacement of an EDFA, ROADM as well as a wavelength switch, but it should be recognized that the invention has a broader range of applicability.

According to an embodiment, a system for multiple-channel line card includes a first photonic integrated device configured to receive a first optical signal and output a first plurality of electrical signals for a first plurality of channels respectively. The first plurality of channels corresponds to a first plurality of wavelength ranges associated with the first optical signal. Additionally, the system includes a first clock and recovery device configured to receive the first plurality of electric signals and retime the first plurality of electric signals, and a first switch coupled to the first clock and recovery device, a first interface, and a second interface. Moreover, the system includes the first interface configured to output a second plurality of electrical signals to another system for multiple-channel line card, and the second interface configured to couple with one or more plugged first channel devices.

The one or more plugged first channel devices are configured to add or drop one or more first electrical signals for one or more first channels respectively. The first switch is coupled to the first clock and recovery device without through any forward error correction device, and each of the one or more plugged first channel devices includes one forward error correction device.

According to another embodiment of the present invention, a method for using a system for multiple-channel line card includes providing a system for multiple-channel line card. The system includes a photonic integrated device configured to receive an optical signal and output a first plurality of electrical signals for a plurality of channels respectively. The plurality of channels corresponds to a plurality of wavelength ranges associated with the optical signal. Additionally, the system further includes a clock and recovery device configured to receive the first plurality of electric signals and retime the first plurality of electric signals, and a switch coupled to the clock and recovery device, a first interface, and a second interface. Moreover, the system further includes the first interface and the second interface. The first interface is configured to output a second plurality of electrical signals to another system for multiple-channel line card. Additionally, the method includes determining a first number of one or more channels for which respectively one or more signals to be added to the optical signal or dropped from the optical signal by the system for multiple-channel line card, and processing information associated with the first number of one or more channels. Moreover, the method includes determining a second number of one or more channel devices based on at least information associated with the first number of one or more channels. The one or more channel devices are configured to add or drop the one or more signals respectively, and the second number is equal to the first number. Also, the method includes plugging the second number of one or more channel devices into the system through the second interface. The switch is coupled to the clock and recovery device without through any forward error correction device, and each of the one or more channel devices includes one forward error correction device.

According to yet another embodiment, a method for dropping a signal by a system for multiple-channel line card includes receiving a first optical signal, processing information associated with the first optical signal, and generating a plurality of electrical signals for a plurality of channels respectively based on at least information associated with the first optical signal. The plurality of channels corresponds to a plurality of wavelength ranges associated with the first optical signal, and the plurality of electrical signals includes an electrical signal. The plurality of channels includes a channel, and the electrical signal corresponds to the channel. Additionally, the method includes receiving the plurality of electrical signals including the electrical signal, retiming the plurality of electric signals by a clock and recovery device, processing information associated with the plurality of electrical signals, and directing the electrical signal from the clock and recovery device to a channel device by a switch. The channel device includes one forward error correction device. Moreover, the method includes processing the electrical signal by at least the forward error correction device, converting the electrical signal to a second optical signal, and sending the second optical signal to a user. The process for directing the electrical signal from the clock and recovery device to a channel device by a switch includes sending the electrical signal from the clock and recovery device to the channel device without going through any forward error correction device.

According to yet another embodiment, a method for adding a signal by a system for multiple-channel line card includes receiving a first optical signal from a user by a channel device. The channel device includes a forward error correction device. Additionally, the method includes converting the first optical signal to an electrical signal, processing the electrical signal by at least the forward error correction device, directing the electrical signal from the channel device to a clock and recovery device by a switch, and receiving a plurality of electrical signals including the electrical signal. Moreover, the method includes retiming the plurality of electric signals by the clock and recovery device, processing information associated with the plurality of electrical signals, and generating a second optical signal based on at least information associated with the plurality of electrical signals. The plurality of electrical signals corresponds to a plurality of channels for the second optical signal respectively, and the plurality of channels is associated with a plurality of wavelength ranges and includes a channel corresponding to the electrical signal. The process for directing the electrical signal from the channel device to a clock and recovery device by a switch includes sending the electrical signal from the channel device to the clock and recovery device without going through any forward error correction device.

Many benefits are achieved by way of the present invention over conventional techniques. For example, according to an embodiment of the invention, a method is provided for supporting much larger networks with simplicity and lower operating expenses in comparison to the all-optical approaches. In an embodiment, optical and electrical impairments of a network are localized and are linearly added rather than exponentially added as in the case of the all-optical networks. According to a specific example of the present invention, networks built with the line cards would require no optical power management, no DCMs and fewer EDFAs, if any. In an embodiment, networks built with the line cards are fully scaleable and reconfigurable. According to certain embodiments of the invention, only limited network configuration tests are required and most of networks can be built with test data from discrete systems and components. For example, considerable reduction in capital expense can be achieved without compromising the overall system performance such network sizes, simplicity, flexibility and robustness. In a specific embodiment, electrical power consumption of the line card is substantially lower than the implementation with line-side FEC being used.

Certain embodiments of the present invention can support long-reach communications with limited error rates. Some embodiments of the present invention can simplify significantly network engineering in comparison to conventional all-optical approaches. In a specific example, no test is needed for various network sizes that have different span/EFDA numbers.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for low-cost multi-channel DWDM line card based on monolithically/hybrid integrated DWDM transmitter/receiver arrays. Merely by way of example, an application of the invention is a cost-competitive replacement of an EDFA, ROADM as well as a wavelength switch, but it should be recognized that the invention has a broader range of applicability.

Figure 1:
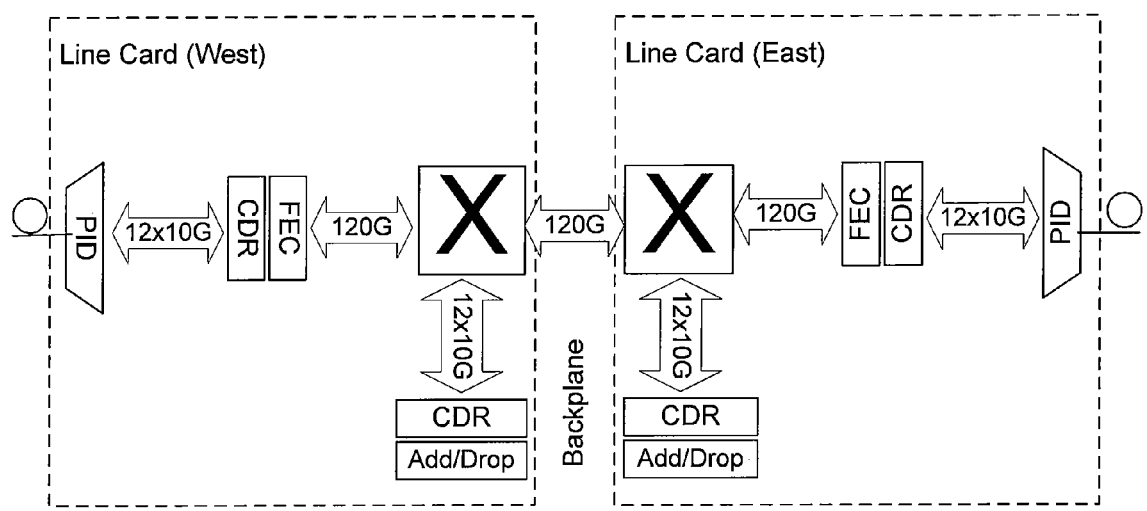
FIG. 1 is a simplified diagram showing a conventional system for configuring a regeneration/ROADM node.

FIG. 1 is a simplified diagram showing a conventional system for configuring a regeneration/ROADM node. The simplified diagram uses two 12-channel line cards as an example. In this example, a photonic integrated device (PID) includes 12 DWDM transponders that are wavelength multiplexed/demultiplexed by an AWG. In this approach, 10G optical signals of different wavelengths from an upstream node are first converted in parallel to electrical signals by the PID. A clock and data recovery (CDR) circuit is used to recover the clock from received optical data in each channel and retime the data for its continued transmission along the link. Each channel is then corrected for transmission errors by an optical transport processor with build-in forward error correction (FEC). The 12 error-corrected channels are then directed to either the tributary for add/drop or through backplane connection to another line card which encodes the electrical signals with an FEC, recovers the clock and retimes the data again with a CDR, and finally converts the electrical signals back to optical signals with a PID for transmission over fiber to the downstream node. If a 12×12 non-blocking switch at 10G is used, such a node is effectively a ROADM node with full regeneration for pass-through channels.

However, the conventional system as shown in FIG. 1 often requires the use of FEC for every channel coming into and going out of the node, independent of how many channel are actually added/dropped at the tributary. For example, even if one drops one channel in each direction, the conventional system usually still requires 12 FEC chips on each line card. As an example, a 10G strong FEC may cost about $400 per channel and its power consumption is about 5 W, so 12 such chips can add an additional cost of about $4800 and a power consumption of about 60 W to the line card regardless of the number of add/drop channels at the tributary. In many applications, this additional cost for FECs is close to half of the cost of EDFA plus ROADM and thus makes the above conventional system uneconomical for being deployed at every node.

Figure 2:
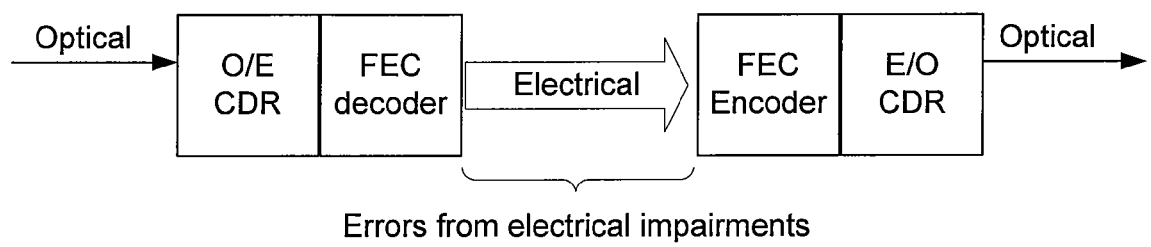
FIG. 2 is a simplified diagram showing an origin of uncorrected errors in the conventional system.

Additionally, the conventional system as shown in FIG. 1 can have additional limitations. FIG. 2 is a simplified diagram showing an origin of uncorrected errors in the conventional system. As shown, the conventional system can leave a large segment of the link between FEC decoder and FEC encoder error uncorrected. This large segment of the link includes high-speed switches and backplane connections, which can cause signal distortions and electrical noises. For example, errors from transmission over high-speed backplane and poor jitter performance of the switches can accumulate from node to node, degrading the overall transmission performance. Hence, the overall link performance can be limited by the transmission performance of this large segment in many applications.

Figure 3:
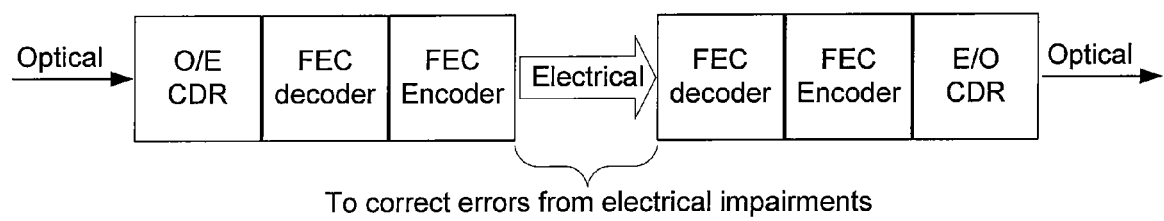
FIG. 3 is a simplified diagram showing a conventional system using dual FECs in a back-to-back configuration.

FIG. 3 is a simplified diagram showing a conventional system using dual FECs in a back-to-back configuration. The use of dual FECs can eliminate errors from the electrical impairments in many applications. But this conventional system, although corrects errors from both optical and electrical impairments, often increases the deployment cost considerably if ROADM feature is also needed.

Figure 4:
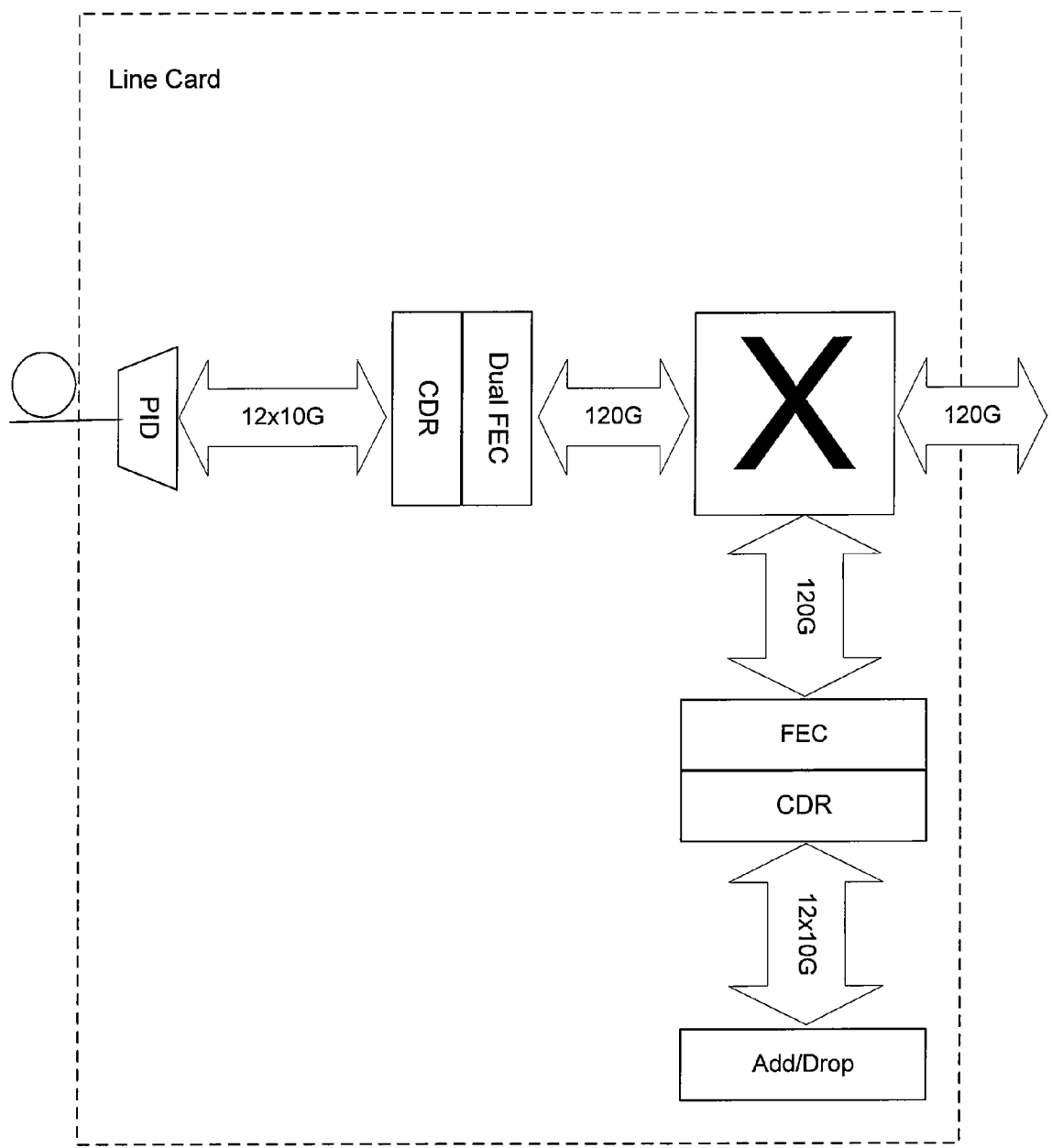
FIG. 4 is a simplified diagram showing a conventional system.

FIG. 4 is a simplified diagram showing a conventional system. The conventional system uses a multi-channel line card with back-to-back FECs at the line side to remove errors from the transmission over high-speed backplane in certain applications. However, to use this conventional approach for ROADM, it is often necessary to add a corresponding FEC at the tributary as well for encoding/decoding. Without the FEC, the signal to be dropped at the tributary usually is not decoded. Similarly, without the FEC, the signal to be added at tributary usually is not encoded, and therefore the dual FEC at the line side cannot read the signal correctly for transmission over the fiber for many applications. Hence, the conventional implementation as shown in FIG. 4 often requires two FECs per channel. For example, one of the two FECs is the dual FEC that performs both encoding and decoding for a given signal, and another of the two FECs performs encoding for an added signal and performs decoding for a dropped signal. As another example, a 12-channel line card includes 24 FECs, making it expensive for many real field deployments.

Figure 5:
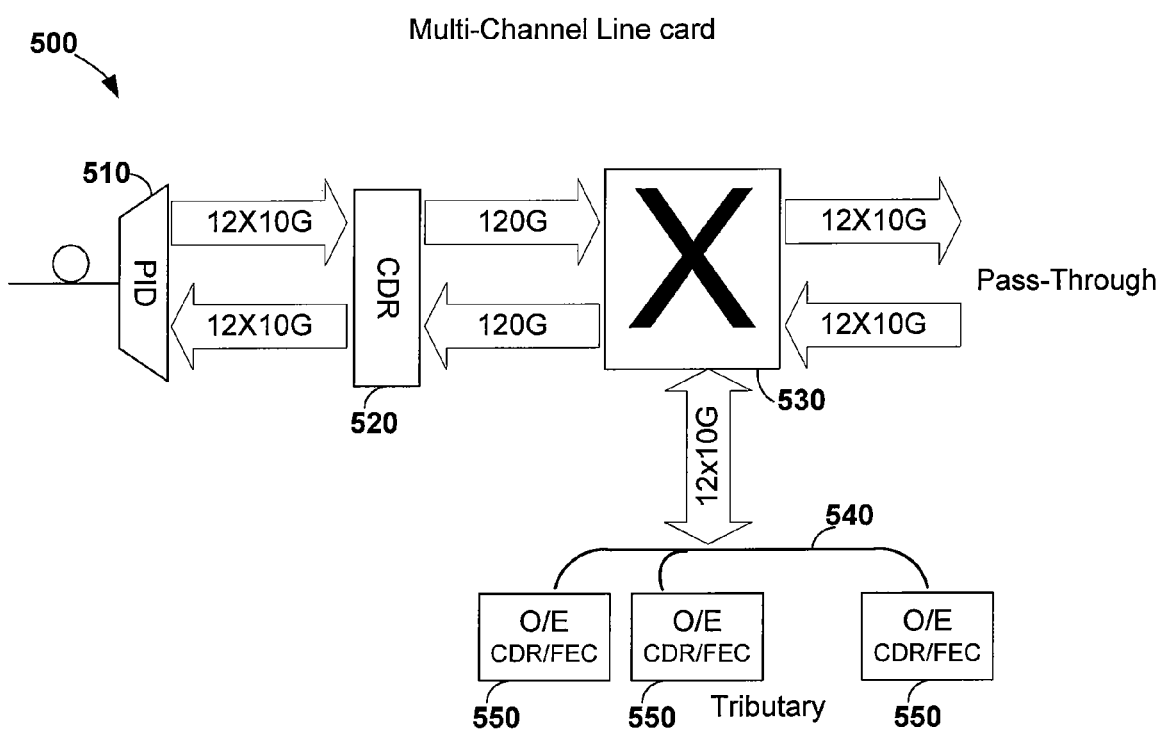
FIG. 5 is a simplified system for DWDM line card according an embodiment of the present invention.

FIG. 5 is a simplified system for DWDM line card according an embodiment of the present invention. This diagram is merely an example, which should not unduly limit the scope of the claims. One of ordinary skill in the art would recognize many variations, alternatives, and modifications. A system 500 includes a photonic integrated device 510, a clock and recovery device 520, a switch 530, and an interface 540. Although the above has been shown using a selected group of components for the system 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The photonic integrated device 510 is configured to receive an optical signal from the line side or output an optical signal to the line side. Additionally, the photonic integrated device 510 is configured to output or receive a plurality of electrical signals for a plurality of channels respectively. The plurality of channels corresponds to a plurality of wavelength ranges for the received or outputted optical signal.

According to an embodiment, the photonic integrated device 510 includes an arrayed waveguide grating device and a plurality of transponders. For example, the arrayed waveguide grating device is configured to receive the optical signal from the line side, demultiplex the received optical signal, and generate a plurality of optical signals corresponding to the plurality of wavelength ranges. In another example, the plurality of transponders is configured to receive the plurality of optical signals respectively and convert the plurality of optical signals into the plurality of electrical signals respectively.

The clock and recovery device 520 is coupled to the photonic integrated device 510. For example, the clock and recovery device 520 is configured to receive the plurality of electric signals from the photonic integrated device 510. In another example, the clock and recovery device 520 is further configured to recover a clock signal for each of the plurality of electric signals and retime each of the plurality of electric signals according to the clock signal.

The switch 530 is coupled to the clock and recovery device 520 and the interface 540. For example, the switch 530 is coupled to the clock and recovery device 520 without through any forward error correction device. For each of the plurality of electrical signals, the switch 530 is capable of directing the each of the plurality of electrical signals to one of the one or more plugged channel devices 550.

The interface 540 is configured to couple with one or more plugged channel devices 550. The one or more plugged channel devices 550 are configured to add or drop one or more electrical signals for one or more channels respectively. In one embodiment, each of the one or more plugged channel devices 550 includes one forward error correction device. For example, each of the one or more plugged channel devices 550 includes only one forward error correction device and other component or components that do not include any forward error correction device. In another example, the system 500 is a parent card, and each of the one or more plugged channel devices 550 is a child card. In one embodiment, the child card is known as a daughter card. In another embodiment, the child card is capable of being plugged into the parent card through the interface 540.

As discussed above and further emphasized here, FIG. 5 is merely an example, which should not unduly limit the scope of the claims. One of ordinary skill in the art would recognize many variations, alternatives, and modifications. For example, another interface is also a component of the system 500. Through the another interface, the system 500 can be coupled to another system for DWDM line card. According to an embodiment, the system 500 output a plurality of electrical signals to the another system for DWDM line card.

Figure 6:
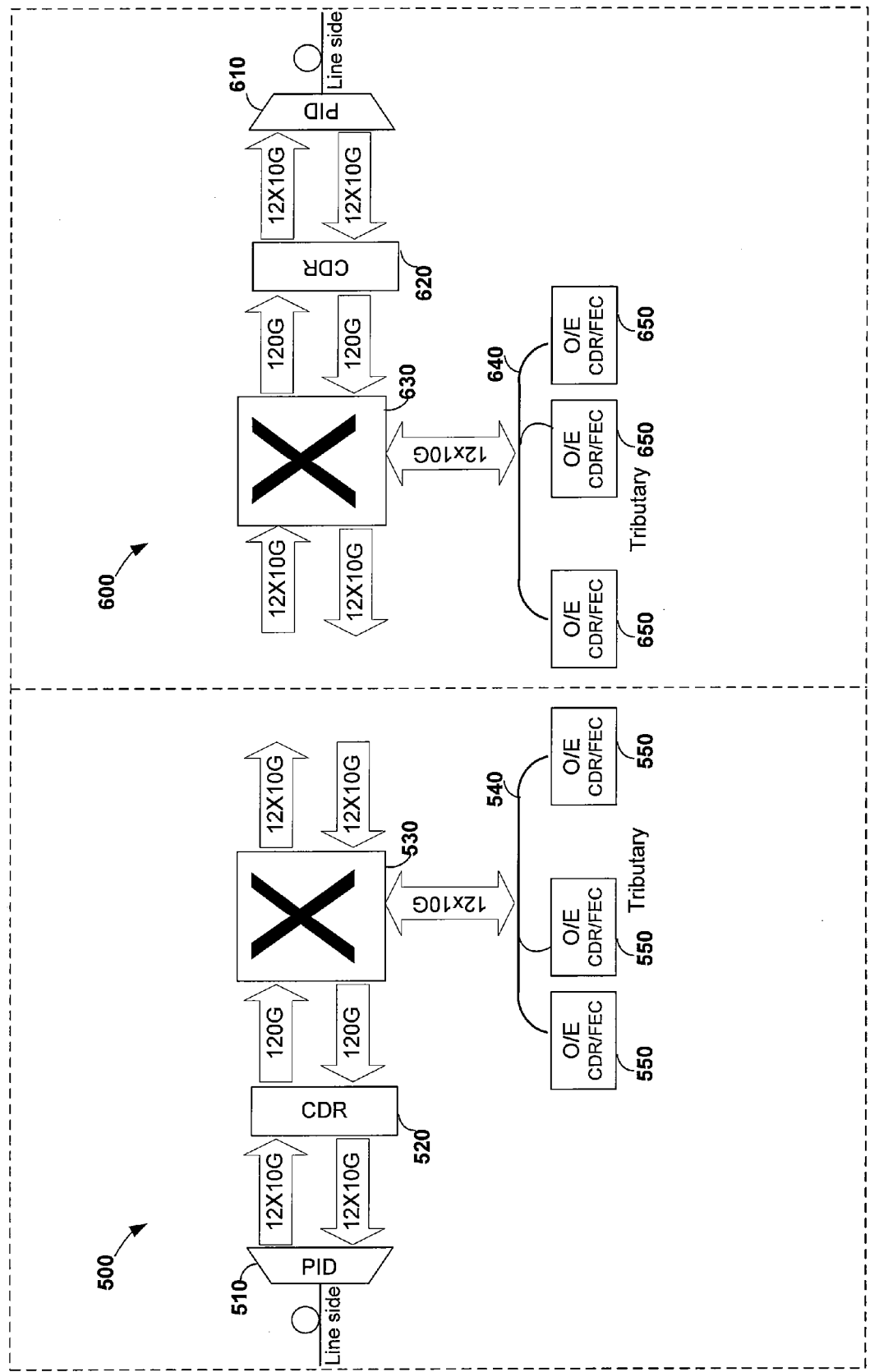
FIG. 6 is a simplified diagram showing two systems for DWDM line card coupled to each other according to another embodiment of the present invention.

FIG. 6 is a simplified diagram showing two systems for DWDM line card coupled to each other according to another embodiment of the present invention. This diagram is merely an example, which should not unduly limit the scope of the claims. One of ordinary skill in the art would recognize many variations, alternatives, and modifications.

As shown, the system 500 for DWDM line card is coupled to the system 600 for DWDM line card. In one embodiment, the system 600 is substantially the same as the system 500. For example, the system 600 includes a photonic integrated device 610, a clock and recovery device 620, a switch 630, and an interface 640. In another example, the photonic integrated device 510, the clock and recovery device 520, the switch 530, and the interface 540 are substantially the same as the photonic integrated device 610, the clock and recovery device 620, the switch 630, and the interface 640 respectively, according to an embodiment of the present invention.

In another embodiment, the system 600 further includes another interface, through which the system 600 is coupled to the system 500. For example, the another interface is coupled to the switch 630. In another example, through the another interface, the system 600 is configured to receive a plurality of electrical signals from the system 500. Additionally, the interface 540 is coupled to the switch 630 and configured to couple with one or more plugged channel devices 650. For example, individually, the one or more plugged channel devices 650 are substantially the same as the one or more plugged channel devices 550. In another example, the one or more plugged channel devices 650 are configured to add or drop one or more electrical signals for one or more channels respectively.

In one embodiment, each of the one or more plugged channel devices 650 includes one forward error correction device. For example, each of the one or more plugged channel devices 650 includes only one forward error correction device and other component or components that do not include any forward error correction device. In another example, the system 600 is a parent card, and each of the one or more plugged channel devices 650 is a child card. The child card is capable of being plugged into the parent card through the interface 640.

Additionally, the clock and recovery device 620 is coupled to the switch 630. For example, the clock and recovery device 620 is coupled to the switch 630 without through any forward error correction device. In another example, the clock and recovery device 620 is configured to receive a plurality of electric signals and retime the plurality of electric signals. Moreover, the photonic integrated device 610 is coupled to the clock and recovery device 620. For example, the photonic integrated device 610 is configured to receive the plurality of electrical signals for a plurality of channels respectively and output an optical signal to the line side. In one embodiment, the plurality of channels corresponds to a plurality of wavelength ranges associated with the outputted optical signal.

As discussed above, according to an embodiment, the system 500 includes another interface through which the system 500 is coupled to the system 600, and the system 600 includes another interface through which the system 600 is coupled to the system 500. For example, the another interface of the system 500 and the another interface of the system 600 share a common backplane.

Figure 7:
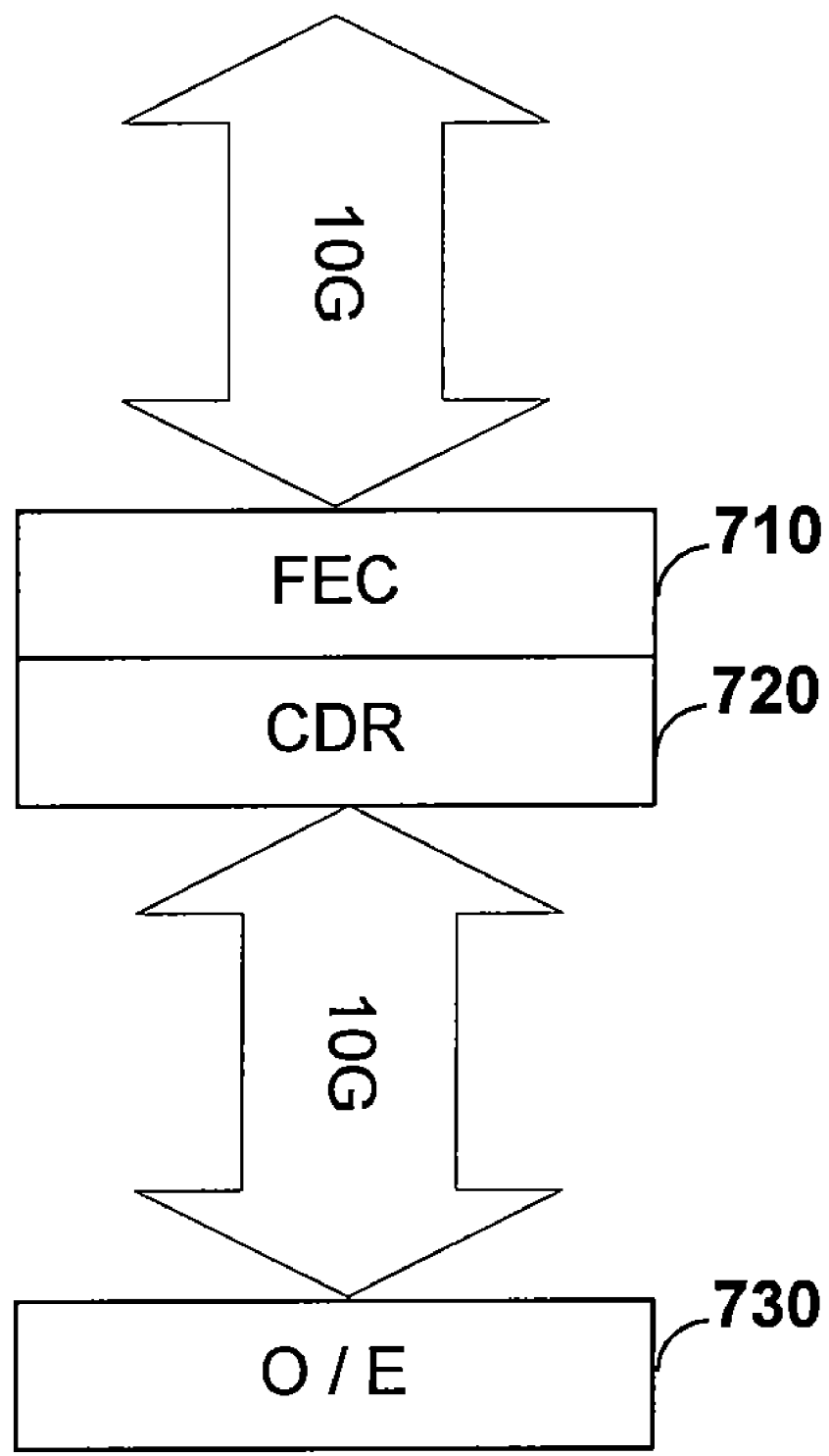
FIG. 7 is a simplified diagram for a channel device that can be coupled to a system for DWDM line card according to an embodiment of the present invention.

Additionally, according to one embodiment, the one or more plugged channel devices 650 are substantially the same as the one or more plugged channel devices 550 individually. FIG. 7 is a simplified diagram for a channel device 550 or 650 that can be coupled to the system 500 or 600 for DWDM line card according to an embodiment of the present invention. This diagram is merely an example, which should not unduly limit the scope of the claims. One of ordinary skill in the art would recognize many variations, alternatives, and modifications.

As shown in FIG. 7, the channel device includes a forward error correction device 710, a clock and recovery device 720, and a transponder 730. For example, the forward error correction device 710 can be coupled to the switch 530 or 630 through the interface 540 or 640 respectively. Additionally, the clock and recovery device 720 is coupled to the forward error correction device 710 and the transponder 730. In one embodiment, the transponder 730 is configured to receive an electrical signal from the clock and recovery device 720, convert the electrical signal to an optical signal, and output the optical signal to a user. In another embodiment, the transponder 730 is configured to receive an optical signal from a user, convert the optical signal to an electrical signal, and output the electrical signal to the clock and recovery device 720.

According to certain embodiments of the present invention, techniques are provided for a low-cost multi-channel DWDM line card based on monolithically/hybrid integrated DWDM transmitter/receiver arrays. In one embodiment, as shown in FIG. 5, the multi-channel line card does not have any FEC at line-side, but instead has an FEC at the tributary along with a short-reach transponder. For example, each 10G interface at the tributary with the FEC is pluggable, preferably as a daughter card to release otherwise required high backplane capacity. In another example, the FEC is only needed when there is an add/drop channel. If no such a channel is present at the tributary, no FEC is required. Some embodiments of the present invention can reduce the number of FECs required for a line card considerably in comparison to conventional approaches. For example, this reduction is especially substantial when the corresponding node is to be configured as ROADM with only few add/drop channels. As an example, in a real field deployment, the number of add/drop channels at a ROADM node is about 10-15% of the total number of wavelengths used, suggesting one add/drop channel per PID (e.g., per 12 channels) per node on average. Therefore, instead of using 12 FEC units per line card one needs only 1 FEC, a 92% reduction in FEC on average according to an embodiment of the present invention.

Figure 8:
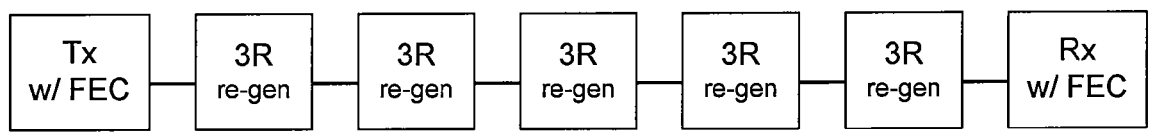
FIG. 8 is a simplified diagram showing transmission link of the system for DWDM line card according an embodiment of the present invention.

FIG. 8 is a simplified diagram showing transmission link of the system for DWDM line card according an embodiment of the present invention. This diagram is merely an example, which should not unduly limit the scope of the claims. One of ordinary skill in the art would recognize many variations, alternatives, and modifications.

As shown in FIG. 8, each "pass-through" node acts like a 3R (re-amplifying, re-shaping, and re-timing) regeneration unit without FEC. In one embodiment, optical impairments from each span are localized and thus not propagated to the next span. For example, an EDFA is only a 1R (re-amplifying) unit which often cannot reset optical impairments such as chromatic dispersion. The dispersion accumulates from span to span and as a result it can degrade BER exponentially. According to certain embodiments of the current invention, however, such optical impairments are reset after each 3R regeneration unit. In a specific example, the only parameter that can propagate to the next span is the binary errors and the errors from different spans add linearly. In another example, the same analysis is applicable to the electrical impairments generated within a 3R unit. Therefore, according to an embodiment, if a link has N spans and M "pass-through" nodes each of which has an independent BER, $\rho^{(o)}$ and $\rho^{(e)}$ respectively, the total errors generated over such a link between FEC of the transmitter and FEC of the receiver is a linear addition of all errors from each segment independently, i.e.

$$BER_{total} = \sum_{i=1}^{N} \rho_i^{(o)} + \sum_{j=1}^{M} \rho_j^{(e)}$$

where $\rho_i^{(o)}$ represents error for the i-th span, and $\rho_j^{(e)}$ represents error for the j-th "pass-through" node. Additionally, $BER_{total}$ represents the total error over the link without any error correction by the FECs at both ends of the link.

According to an embodiment, if $BER_{total}$ is less than $10^{-3}$, the use of strong FECs at both ends of the link would enable the link to support errorless communication (e.g., BER< $10^{-15}$ with error corrections). For example, in a metro network with up to 10 pass-through nodes (i.e., 11 spans), each segment can have a BER up to $10^{-5}$ on average, which easily translates to a span distance up to 80 km without EDFA. In another example, errors from electrical impairments due to high-speed backplane and switches can be comfortably controlled below a BER level of $10^{-6}$. Thus, according to certain embodiments, the impact from the electrical impairments is often negligible and the maximum reach should be comparable to that obtained with the conventional line-side FEC approach.

According to another embodiment of the present invention, a method for using a system for multiple-channel line card includes providing a system for multiple-channel line card. For example, the system is the system 500 or the system 600. In another example, the system includes a photonic integrated device configured to receive an optical signal and output a first plurality of electrical signals for a plurality of channels respectively. The plurality of channels corresponds to a plurality of wavelength ranges associated with the optical signal. Additionally, the system further includes a clock and recovery device configured to receive the first plurality of electric signals and retime the first plurality of electric signals, and a switch coupled to the clock and recovery device, a first interface, and a second interface. Moreover, the system further includes the first interface and the second interface. The first interface is configured to output a second plurality of electrical signals to another system for multiple-channel line card. Additionally, the method includes determining a first number of one or more channels for which respectively one or more signals to be added to the optical signal or dropped from the optical signal by the system for multiple-channel line card, and processing information associated with the first number of one or more channels. Moreover, the method includes determining a second number of one or more channel devices based on at least information associated with the first number of one or more channels. The one or more channel devices are configured to add or drop the one or more signals respectively, and the second number is equal to the first number. Also, the method includes plugging the second number of one or more channel devices into the system through the second interface. The switch is coupled to the clock and recovery device without through any forward error correction device, and each of the one or more channel devices includes one forward error correction device. For example, the method is implemented according to FIGS. 5, 6, 7, and/or 8.

In another example, the process for providing a system for multiple-channel line card includes providing the system that does not include any channel device capable of adding any signal to the optical signal or dropping any signal from the optical signal. In yet another example, the process for plugging the second number of one or more channel devices into the system through the second interface includes plugging one or more child cards into a parent card through the second interface. In one embodiment, the parent card includes the system for multiple-channel line card. In another embodiment, each of the one or more child cards includes one of the one or more channel devices. In yet another example, for each of the first plurality of electrical signals, the switch is capable of directing the each of the first plurality of electrical signals to one of the one or more plugged channel devices.

According to yet another embodiment, a method for dropping a signal by a system for multiple-channel line card includes receiving a first optical signal, processing information associated with the first optical signal, and generating a plurality of electrical signals for a plurality of channels respectively based on at least information associated with the first optical signal. The plurality of channels corresponds to a plurality of wavelength ranges associated with the first optical signal, and the plurality of electrical signals includes an electrical signal. The plurality of channels includes a channel, and the electrical signal corresponds to the channel. Additionally, the method includes receiving the plurality of electrical signals including the electrical signal, retiming the plurality of electric signals by a clock and recovery device, processing information associated with the plurality of electrical signals, and directing the electrical signal from the clock and recovery device to a channel device by a switch. The channel device includes one forward error correction device. Moreover, the method includes processing the electrical signal by at least the forward error correction device, converting the electrical signal to a second optical signal, and sending the second optical signal to a user. The process for directing the electrical signal from the clock and recovery device to a channel device by a switch includes sending the electrical signal from the clock and recovery device to the channel device without going through any forward error correction device. For example, the method is implemented according to FIGS. 5, 6, 7, and/or 8.

In another example, the process for processing information associated with the first optical signal includes demultiplexing the first optical signal and generating a plurality of optical signals corresponding to the plurality of wavelength ranges. In yet another example, the process for generating a plurality of electrical signals for a plurality of channels respectively includes receiving the plurality of optical signals, and converting the plurality of optical signals into the plurality of electrical signals respectively. In yet another example, the process for retiming the plurality of electric signals by a clock and recovery device includes recovering a clock signal for each of the plurality of electric signals, and retiming each of the plurality of electric signals based on at least information associated with the clock signal. In yet another example, the process for sending the electrical signal from the clock and recovery device to the channel device without going through any forward error correction device includes reconfiguring one or more signal paths within the switch based on at least information associated with the plurality of electrical signals, and carrying the electrical signal from the clock and recovery device to the channel device over at least one of the one or more signal paths.

According to yet another embodiment, a method for adding a signal by a system for multiple-channel line card includes receiving a first optical signal from a user by a channel device. The channel device includes a forward error correction device. Additionally, the method includes converting the first optical signal to an electrical signal, processing the electrical signal by at least the forward error correction device, directing the electrical signal from the channel device to a clock and recovery device by a switch, and receiving a plurality of electrical signals including the electrical signal. Moreover, the method includes retiming the plurality of electric signals by the clock and recovery device, processing information associated with the plurality of electrical signals, and generating a second optical signal based on at least information associated with the plurality of electrical signals. The plurality of electrical signals corresponds to a plurality of channels for the second optical signal respectively, and the plurality of channels is associated with a plurality of wavelength ranges and includes a channel corresponding to the electrical signal. The process for directing the electrical signal from the channel device to a clock and recovery device by a switch includes sending the electrical signal from the channel device to the clock and recovery device without going through any forward error correction device. For example, the method is implemented according to FIGS. 5, 6, 7, and/or 8.

In another example, the process for processing information associated with the plurality of electrical signals includes receiving the plurality of electrical signals, and converting the plurality of electrical signals into a plurality of optical signals respectively. In yet another example, the process for generating a second optical signal includes multiplexing the plurality of optical signals. In yet another example, the process for retiming the plurality of electric signals by the clock and recovery device includes recovering a clock signal for each of the plurality of electric signals, and retiming each of the plurality of electric signals based on at least information associated with the clock signal. In yet another example, the process for sending the electrical signal from the channel device to the clock and recovery device without going through any forward error correction device includes reconfiguring one or more signal paths within the switch based on at least information associated with the plurality of electrical signals, and carrying the electrical signal from the channel device to the clock and recovery device over at least one of the one or more signal paths.

Some embodiments of the present invention is directed to fiber optical transport systems. In one embodiment, techniques are provided for a low-cost multi-channel DWDM line card based on monolithically/hybrid integrated DWDM transmitter/receiver arrays. In another embodiment, the invention provides a method and system that includes turning a multi-channel line card into a multi-function subsystem at a reduced cost without compromising the line-card performance. Merely as an example, the line card can be configured as a cost-competitive replacement of an EDFA, ROADM as well as a wavelength switch.

Depending on the embodiments, the present invention includes one or more, or even all, of the following features:
  A DWDM multi-channel line card has tributary interfaces and electrical "pass-through" and can be configured for 3R regeneration or ROADM.
  FEC encoding/decoding chips are located at the tributary interfaces, with no FECs at the line side. Thus, FEC is only used for the add/drop channels and no FEC is needed for pass-through channels.
  Any one channel at the line side can be switched to any tributary interface as well as any pass-through channel with a fully non-blocking switch for 3R regeneration, ROADM and equipment protection.
  Linear BER algorithm offers simplicity in network engineering.

As shown, the above features may be in one or more of the embodiments. These features are merely examples, which should not unduly limit the scope of the claims herein. One of ordinary skill in the art would recognize many variations, modifications, and alternatives.

Many benefits are achieved by way of the present invention over conventional techniques. For example, according to an embodiment of the invention, a method is provided for supporting much larger networks with simplicity and lower operating expenses in comparison to the all-optical approaches. In an embodiment, optical and electrical impairments of a network are localized and are linearly added rather than exponentially added as in the case of the all-optical networks. According to a specific example of the present invention, networks built with the line cards would require no optical power management, no DCMs and fewer EDFAs, if any. In an embodiment, networks built with the line cards are fully scaleable and reconfigurable. According to certain embodiments of the invention, only limited network configuration tests are required and most of networks can be built with test data from discrete systems and components. For example, considerable reduction in capital expense can be achieved without compromising the overall system performance such network sizes, simplicity, flexibility and robustness. In a specific embodiment, electrical power consumption of the line card is substantially lower than the implementation with line-side FEC being used.

Certain embodiments of the present invention can support long-reach communications with limited error rates. Some embodiments of the present invention can simplify significantly network engineering in comparison to conventional all-optical approaches. In a specific example, no test is needed for various network sizes that have different span/EFDA numbers.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for multiple-channel line card, the system comprising:
    a first photonic integrated device configured to receive a first optical signal and output a first plurality of electrical signals for a first plurality of channels respectively, the first plurality of channels corresponding to a first plurality of wavelength ranges associated with the first optical signal;
    a first clock and recovery device configured to receive the first plurality of electric signals and retime the first plurality of electric signals;
    a first switch coupled to the first clock and recovery device, a first interface, and a second interface;
    the first interface configured to output a second plurality of electrical signals to another system for multiple-channel line card;
    the second interface configured to couple with one or more plugged first channel devices, the one or more plugged first channel devices configured to add or drop one or more first electrical signals for one or more first channels respectively;
    wherein:
        the first switch is coupled to the first clock and recovery device without through any forward error correction device;
        each of the one or more plugged first channel devices includes one forward error correction device.

2. The system of claim 1 wherein the first photonic integrated device comprises:
    an arrayed waveguide grating device configured to receive the first optical signal, demultiplex the first optical signal, and generate a plurality of optical signals corresponding to the first plurality of wavelength ranges;
    a plurality of transponders configured to receive the plurality of optical signals respectively and convert the plurality of optical signals into the first plurality of electrical signals respectively.

3. The system of claim 1 wherein the first clock and recovery device is further configured to recover a clock signal for each of the first plurality of electric signals and retime each of the first plurality of electric signals based on at least information associated with the clock signal.

4. The system of claim 1 wherein:
    the system for multiple-channel line card is a parent card;
    each of the one or more plugged first channel devices is a child card capable of being plugged into the parent card through the second interface.

5. The system of claim 1 wherein for each of the first plurality of electrical signals, the first switch is capable of directing the each of the first plurality of electrical signals to one of the one or more plugged first channel devices.

6. The system of claim 1 wherein the another system for multiple-channel line card comprises:
    a third interface configured to receive the second plurality of electrical signals;
    a fourth interface configured to couple with one or more second plugged channel devices, the one or more second plugged channel devices configured to add or drop one or more second electrical signals for one or more second channels respectively;
    a second switch coupled to the third interface and the fourth interface;
    a second clock and recovery device coupled to the second switch and configured to receive a third plurality of electric signals and retime the third plurality of electric signals;
    a second photonic integrated device configured to receive the third plurality of electrical signals for a second plurality of channels respectively and output a second optical signal, the second plurality of channels corresponding to a second plurality of wavelength ranges associated with the second optical signal;
    wherein:
        the second clock and recovery device is coupled to the second switch without through any forward error correction device;
        each of the one or more plugged second channel devices includes one forward error correction device.

7. The system of claim 6 wherein:
    the another system for multiple-channel line card is a first parent card;
    each of the one or more plugged second channel devices is a first child card capable of being plugged into the first parent card through the fourth interface.

8. The system of claim 7 wherein:
    the system for multiple-channel line card is a second parent card;
    each of the one or more plugged first channel devices is a second child card capable of being plugged into the second parent card through the second interface.

9. A method for using a system for multiple-channel line card, the method comprising:
    providing a system for multiple-channel line card, the system including a photonic integrated device configured to receive an optical signal and output a first plurality of electrical signals for a plurality of channels respectively, the plurality of channels corresponding to a plurality of wavelength ranges associated with the optical signal, the system further including a clock and recovery device configured to receive the first plurality of electric signals and retime the first plurality of electric signals, a switch coupled to the clock and recovery device, a first interface, and a second interface, the system further including the first interface and the second interface, the first interface configured to output a second plurality of electrical signals to another system for multiple-channel line card;
    determining a first number of one or more channels for which respectively one or more signals to be added to the optical signal or dropped from the optical signal by the system for multiple-channel line card;
    processing information associated with the first number of one or more channels;
    determining a second number of one or more channel devices based on at least information associated with the first number of one or more channels, the one or more channel devices configured to add or drop the one or more signals respectively, the second number being equal to the first number;
    plugging the second number of one or more channel devices into the system through the second interface;
    wherein:
        the switch is coupled to the clock and recovery device without through any forward error correction device;

each of the one or more channel devices includes one forward error correction device.

10. The method of claim 9 wherein the process for providing a system for multiple-channel line card includes providing the system that does not include any channel device capable of adding any signal to the optical signal or dropping any signal from the optical signal.

11. The method of claim 9 wherein:
the process for plugging the second number of one or more channel devices into the system through the second interface includes plugging one or more child cards into a parent card through the second interface;
the parent card includes the system for multiple-channel line card;
each of the one or more child cards includes one of the one or more channel devices.

12. The system of claim 9 wherein for each of the first plurality of electrical signals, the switch is capable of directing the each of the first plurality of electrical signals to one of the one or more plugged channel devices.

13. A method for dropping a signal by a system for multiple-channel line card, the method comprising:
receiving a first optical signal;
processing information associated with the first optical signal;
generating a plurality of electrical signals for a plurality of channels respectively based on at least information associated with the first optical signal, the plurality of channels corresponding to a plurality of wavelength ranges associated with the first optical signal, the plurality of electrical signals including an electrical signal, the plurality of channels including a channel, the electrical signal corresponding to the channel;
receiving the plurality of electrical signals including the electrical signal;
retiming the plurality of electric signals by a clock and recovery device;
processing information associated with the plurality of electrical signals;
directing the electrical signal from the clock and recovery device to a channel device by a switch, the channel device including one forward error correction device;
processing the electrical signal by at least the forward error correction device;
converting the electrical signal to a second optical signal;
sending the second optical signal to a user;
wherein the process for directing the electrical signal from the clock and recovery device to a channel device by a switch includes sending the electrical signal from the clock and recovery device to the channel device without going through any forward error correction device.

14. The method of claim 13 wherein the process for processing information associated with the first optical signal comprises:
demultiplexing the first optical signal;
generating a plurality of optical signals corresponding to the plurality of wavelength ranges.

15. The method of claim 14 wherein the process for generating a plurality of electrical signals for a plurality of channels respectively comprises:
receiving the plurality of optical signals;
converting the plurality of optical signals into the plurality of electrical signals respectively.

16. The method of claim 14 wherein the process for retiming the plurality of electric signals by a clock and recovery device comprises:
recovering a clock signal for each of the plurality of electric signals;
retiming each of the plurality of electric signals based on at least information associated with the clock signal.

17. The method of claim 14 wherein the process for sending the electrical signal from the clock and recovery device to the channel device without going through any forward error correction device comprises:
reconfiguring one or more signal paths within the switch based on at least information associated with the plurality of electrical signals;
carrying the electrical signal from the clock and recovery device to the channel device over at least one of the one or more signal paths.

18. A method for adding a signal by a system for multiple-channel line card, the method comprising:
receiving a first optical signal from a user by a channel device, the channel device including a forward error correction device;
converting the first optical signal to an electrical signal;
processing the electrical signal by at least the forward error correction device;
directing the electrical signal from the channel device to a clock and recovery device by a switch;
receiving a plurality of electrical signals including the electrical signal;
retiming the plurality of electric signals by the clock and recovery device;
processing information associated with the plurality of electrical signals;
generating a second optical signal based on at least information associated with the plurality of electrical signals, the plurality of electrical signals corresponding to a plurality of channels for the second optical signal respectively, the plurality of channels being associated with a plurality of wavelength ranges and including a channel corresponding to the electrical signal;
wherein the process for directing the electrical signal from the channel device to a clock and recovery device by a switch includes sending the electrical signal from the channel device to the clock and recovery device without going through any forward error correction device.

19. The method of claim 18 wherein the process for processing information associated with the plurality of electrical signals comprises:
receiving the plurality of electrical signals;
converting the plurality of electrical signals into a plurality of optical signals respectively.

20. The method of claim 19 wherein the process for generating a second optical signal comprises multiplexing the plurality of optical signals.

21. The method of claim 18 wherein the process for retiming the plurality of electric signals by the clock and recovery device comprises:
recovering a clock signal for each of the plurality of electric signals;
retiming each of the plurality of electric signals based on at least information associated with the clock signal.

22. The method of claim 18 wherein the process for sending the electrical signal from the channel device to the clock and recovery device without going through any forward error correction device comprises:
reconfiguring one or more signal paths within the switch based on at least information associated with the plurality of electrical signals;
carrying the electrical signal from the channel device to the clock and recovery device over at least one of the one or more signal paths.

* * * * *